United States Patent [19]

Mallory

[11] 4,362,544
[45] Dec. 7, 1982

[54] FLUID CONTROL SYSTEM FOR GLASSWARE FORMING MACHINE

[75] Inventor: James D. Mallory, Maumee, Ohio

[73] Assignee: Owens-Illinois, Inc., Toledo, Ohio

[21] Appl. No.: 286,410

[22] Filed: Jul. 24, 1981

[51] Int. Cl.³ .............................................. C03B 9/40
[52] U.S. Cl. ...................................... 65/163; 65/161; 65/164; 65/227; 65/229
[58] Field of Search ............... 65/227, 161, 163, 164, 65/229

[56] References Cited

U.S. PATENT DOCUMENTS

| | | | |
|---|---|---|---|
| 1,532,077 | 3/1925 | Quackenbush et al. | 65/227 |
| 1,911,119 | 5/1933 | Ingle | 65/219 |
| 2,273,777 | 2/1942 | Berthold . | |
| 2,289,046 | 7/1942 | Rowe . | |
| 3,024,571 | 3/1962 | Abbott et al. . | |
| 3,762,907 | 10/1973 | Quinn et al. | 65/163 X |
| 4,152,134 | 5/1979 | Dowling et al. | 65/163 |
| 4,162,910 | 7/1979 | Lining et al. | 65/161 X |
| 4,191,548 | 3/1980 | Fortner et al. | 65/79 |

*Primary Examiner*—Arthur D. Kellogg
*Attorney, Agent, or Firm*—D. T. Innis; Myron E. Click; David H. Wilson

[57] ABSTRACT

The disclosure provides an improved construction for a ten-section IS glass forming machine which incorporates on and in the machine frame, all of the control valving and piping necessary to operate all of the sections of the machine according to any selected one of a plurality of different types of processes, resulting in a significant decrease in the proliferation of pipes and valves that were previously required to be added to, and then removed from, the machine as the machine operation was changed from one type of forming process to another. The apparatus of this invention further applies individual controls for effecting the cooling of each parison mold cavity and each blow mold cavity of each multi-cavity section of the machine.

3 Claims, 8 Drawing Figures

FIG. 6A I.S. ELECTRIC VALVES

| Valve No. | Function | Size 5/16 | 1/2 | Location | B.B. | 51 | V.B. | 41 | 62 | P.B. |
|---|---|---|---|---|---|---|---|---|---|---|
| 1 | Close Blank | | x | C | x | x | x | x | x | x |
| 2 | Open Blank | | x | C | x | x | x | x | x | x |
| 3 | Plunger Up, Front | | x | D | x | x | x | x | x | x |
| 4 | Plunger Up, Center | | x | D | x | x | x | x | x | x |
| 5 | Plunger Up, Rear | | x | D | x | x | x | x | x | x |
| 6 | Thimble Down, Front | x | | C | x | x | x | x | x | x |
| 7 | Thimble Down, Center | x | | C | x | x | x | x | x | x |
| 8 | Thimble Down, Rear | x | | C | x | x | x | x | x | x |
| 9 | Counterblow Front | | x | F | x | x | x | | x | x |
| 10 | Counterblow Center | | x | F | x | x | x | | | |
| 11 | Counterblow Rear | | x | F | x | x | x | | | x |
| 12 | Vacuum Fill, Front | notapplicable | | G | x | x | | | | |
| 13 | Vacuum Fill, Center | " | | G | | x | | | | |
| 14 | Vacuum Fill, Rear | " | | G | | x | | | | |
| 15 | Baffle Down | " | | A | x | x | x | x | x | x |
| 16 | Settle Blow | " | | A | x | | x | | | x |
| 17 | Funnel Down | " | | A | x | x | x | x | x | x |
| 18 | Invert | | x | C | x | x | x | x | x | x |
| 19 | Revert | | x | C | x | x | x | x | x | x |
| 20 | Neck Ring Open | x | | C | x | x | x | | x | x |
| 21 | Mold Close | | x | C | x | x | x | x | x | x |
| 22 | Mold Open | | x | C | x | x | x | x | x | x |
| 23 | Blowhead Down | x | | C | x | x | x | x | x | x |
| 24 | Blowhead Up | x | | C | x | x | x | x | x | x |
| 25 | Final Blow High | notapplicable | | A | x | x | x | x | x | x |

FIG. 6B I.S. ELECTRIC VALVES

| Valve No. | Function | Size 5/16 | Size 1/2 | Location | Process Use B.B. | 51 | V.B. | 41 | 62 | P.B. |
|---|---|---|---|---|---|---|---|---|---|---|
| 26 | Final Blow Low | not applicable | | A | x | x | x | x | x | x |
| 27 | Takeout In | x | | C | x | x | x | x | x | x |
| 28 | Takeout Out | x | | C | x | x | x | x | x | x |
| 29 | Tong Close | x | | C | x | x | x | x | x | x |
| 30 | Tong Open | x | | C | x | x | x | x | x | x |
| 31 | Sweepout Extend | | x | C | x | x | x | x | x | x |
| 32 | Sweepout Retract | | x | C | x | x | x | x | x | x |
| 33 | Blank Spray | not applicable | | A | x | x | x | x | x | x |
| 34 | Mold Vacuum | " " | | A | x | x | x | x | x | x |
| 35 | Guide Air | | x | C | x | x | x | x | x | x |
| 36 | Gob Accelerator, Front | not applicable | | A | x | x | x | x | x | x |
| 37 | Gob Accelerator, Center | " " | | A | x | x | x | x | x | x |
| 38 | Gob Accelerator, Rear | " " | | A | x | x | x | x | x | x |
| 39 | Blank Wind On | x | | E | x | x | x | x | x | x |
| 40 | Blank Wind Off | x | | E | x | x | x | x | x | x |
| 41 | Mold Wind On | x | | E | x | x | x | x | x | x |
| 42 | Mold Wind Off | x | | E | x | x | x | x | x | x |
| 43 | Dead Plate Wind On | x | | E | x | x | x | x | x | x |
| 44 | Dead Plate Wind Off | x | | E | x | x | x | x | x | x |
| 45 | Section Wind On | x | | E | x | x | x | x | x | x |
| 46 | Section Wind Off | x | | E | x | x | x | x | x | x |
| 47 | Delivery Lub On | not applicable | | A | x | x | x | x | | |
| 48 | 41 Blank Down | not applicable | | A | | | | x | | |
| 49 | Neck Ring Clamp | | x | C | | | | | | |
| 50 | Spare | x | | C | | | | | | |

FLUID CONTROL SYSTEM FOR GLASSWARE FORMING MACHINE

FIELD OF THE INVENTION

This invention relates to an improved apparatus for effecting the control in proper sequence of the plurality of applications of pressurized air, cooling wind and/or vacuum required to operate a modern glass forming machine according to any selected one of a plurality of forming processes such as blow and blow, vacuum settle blow and press and blow, to produce either wide mouth or narrow neck glass containers.

BACKGROUND OF THE INVENTION

During the period of the past fifty years, the type of glass container forming machine known in the trade as the individual section or "IS" machine, has developed increased utility such that today it is the dominant machine employed throughout the world in the manufacture of glass containers of the type employed in the packaging industry. The original IS machine is shown and described in U.S. Pat. No. 1,911,119 and produces containers by what has been popularly described as the "blow and blow process." In this basic process, a gob of glass is loaded into an inverted parison mold having neck rings at its bottom end. A baffle is applied to the open top end of the parison mold and a so called settle blowing pressure is applied to the gob of glass to force the molten glass into the cavity defined by the neck rings. Subsequently a counter blow pressure is applied through the bore of the neck rings to blow the gob of glass into intimate engagement with the walls of the parison mold and form a parison having a hollow interior. The baffle is then removed, the parison mold opened, and the inverted parison is transferred to an upright position by the neck rings where it is enclosed within the blow mold by closing two blow mold halves thereon.

The original IS machine was first expanded to increase its productivity by employing double cavity molds, then triple cavity and even quadruple cavity. The number of cavities is, of course, limited by the size of the desired article. Obviously, large containers in excess of two liters in capacity could not be blown on a standard IS machine in more than a double cavity mold. The smaller the container, the more cavities can be employed to simultaneously form such containers. It is quite common today to form twelve ounce beer bottles by triple cavity molds.

At the same time the number of cavities were increasing, the number of sections of the IS machine were substantially increased. It's not uncommon for ten sections to be operated in a common frame.

The world wide utilization of the IS machine was further promoted by the development of alternate processes which could be employed on the machine without a substantial modification thereof. One such process modification is the well known "press and blow" method of operation wherein the parison is formed in the parison mold by a pressing operation. There are now two well known versions of a press and blow mode of operation. One mode is commonly known as the "62 process" wherein the parison molds are split and the pressing is accomplished by raising a plunger through the central bore of the neck rings to compress a gob of glass that had previously been deposited within a cavity defined between the plunger and a surrounding sleeve on which the neck ring and the closable parison mold halves were supported. Such process is described in U.S. Pat. No. 2,289,046 to Rowe. A modified press and blow process, commonly known as the "41 process" is described in U.S. Pat. No. 3,024,571 to Abbott et al. In this process, the parison mold is solid and opened at both its top and bottom ends. A gob of glass is dropped through the open top end of the parison mold to rest upon a plunger inserted through the neck rings, and a baffle is then closed across the open top of the parison mold and the plunger elevated to effect the pressing of the deposited gob into conformity with the walls of the parison mold and the neck rings disposed at the bottom thereof. The baffle is then raised and swung out of position, as is the one piece parison mold, and the press molded parison is transferred by the inverting motion of the neck rings to the blow molding position.

A further modification of the blow and blow process is the utilization of vacuum to assist the initial flow of the gob of glass into the cavities of the neck rings. Following the application of such vacuum, the parison is blown into conformity with the parison mold by a counter blow pressure applied in conventional fashion. This method is commonly known as a "vacuum settle blow" method of operation or "51 process" and is described in U.S. Pat. No. 4,191,548 to Fortner et al.

On the blow mold side of the machine, process revisions have also been effected. One is the employment of vacuum applied through the interior surfaces of the blow molds to assist in the expansion of the parison into engagement with the molding surfaces.

Another process variation is the application of "puff blowing" after the opening of the baffle and prior to removal of the parison molds from the formed parison. An additional puff of air is introduced into the parison at this time and, in certain types of containers does provide improved quality in the finished product. Puff blowing is described in U.S. Pat. No. 2,273,777 to Berthold.

The most significant recent improvement in IS machines is the application of computer control to the multitude of air valving operations that must be carried out in order to cause the machine to operate in accordance with any one of the many aforedescribed process variations. As is well known, the entire operation of an IS machine depends on air, supplied at various pressures, as an actuating fluid, cooling wind and in some cases as a vacuum.

The control of the valving of each section of the original IS machine was effected through the medium of a large rotary drum having a plurality of radially adjustably positioned bolt heads projecting from the periphery of the drum and engaging valve actuators at a selected position as the drum was rotated. As additional sections were added to the machine, additional control bolts were required, hence the common configuration of the IS machine was that of a massive bottom housing within which the rotating control drums occupied the majority of the space, with a multitude of control valves disposed within and on the housing adjacent to the path of the rotary drum and connected by a maze of piping to the large number of operating cylinders and flow valves employed on each section of the machine. It necessarily followed that whenever it was desired to change the forming process being practiced by a particular machine, it was not only necessary to add additional components to the forming mechanism such as pressing plungers, when changing from blow and blow to a "press blow" operation, but, additionally, a plethora of additional pipes, valves and timing bolts had to be added to the machine to effect the conversion of the machine operation from one process to the other. In most cases, the limitations of space to accommodate such piping and valves necessarily dictated that the valves and piping employed for the previous process had to be removed, thus making the conversion from one process to another a time consuming and expensive proposal.

With the application of computer control to the IS machine, for example as described in U.S. Pat. No. 4,152,134 to Dowling et al., it became possible to employ solenoid type control valves and to locate the great majority of such solenoid control valves in one or two valve blocks which could then be disposed in a convenient location along the front faces of the top and bottom housings of the machine. The removal of the massive timing drum from the base housing of the machine provided more than adequate space for the location of the multitude of fluid conduits required to connect the solenoid control valves to the various operating cylinders of the various sections of the machine. The problem still remains, however, that whenever it is desired to shift the machine from one type of process operation to another, a substantial modification of the plumbing and wiring, and addition of solenoid valves properly connected to such plumbing and wiring had to be effected, and hence the time to convert the IS machine from one process mode to another still remains very substantial.

SUMMARY OF THE INVENTION

This invention provides an improved control valve system for a multi-cavity, multi-section IS glass forming machine which will permit the conversion of the machine from one process mode of operation to another with a minimum of revisions to the machine. In fact, the primary revision required is to add or remove the various plungers, cylinders and associated piping required for press and blow operations. In accordance with the apparatus of this invention, the basic plumbing for all process modes of operation of the machine is permanently installed within the frame of the machine. In fact, in many cases, air channels are formed as an integral part of the machine frame, particular where large volumes of air must be transmitted, such as for parison mold and or blow mold cooling. All of the computer controlled valving required to operate each section of the machine is disposed in any selected convenient location on the front faces of the top and bottom housings of the machine. More importantly, the elimination of the proliferation of external plumbing, which characterized prior art IS forming machines permits the extension of individual conduits to each cavity of a multi-cavity mold employed on each section of the machine, thereby substantially increasing the uniformity of the articles produced by the many cavities of a modern multi-section, multi-cavity IS glass forming machine.

Since all valves are computer controlled, the conversion of the machine from one process mode to another is accomplished simply through selection of the particular computer program designed to control the proper valves in the proper sequence to carry out the desired process. Of course, the non-controlling physical components of the machine, such as pressing plungers required for a press and blow operation, must be added to each section, but little, if any, modification of the control conduits or the control valving will be required to effect the change in process mode.

Further objects and advantages of the invention will be readily apparent to those skilled in the art from the following detailed description, taken in conjunction with the annexed sheet of drawings on which are shown a preferred embodiment of the invention.

BRIEF DESCRIPTION OF THE DRAWINGS

FIGS. 6A and 6B is a chart detailing the location and utilization of the valving components of the machine constructed in accordance with this invention to accomplish the operation of the IS machine in accordance with any selected one of a plurality of operating modes.

DESCRIPTION OF THE PREFERRED EMBODIMENT

Figure 1:
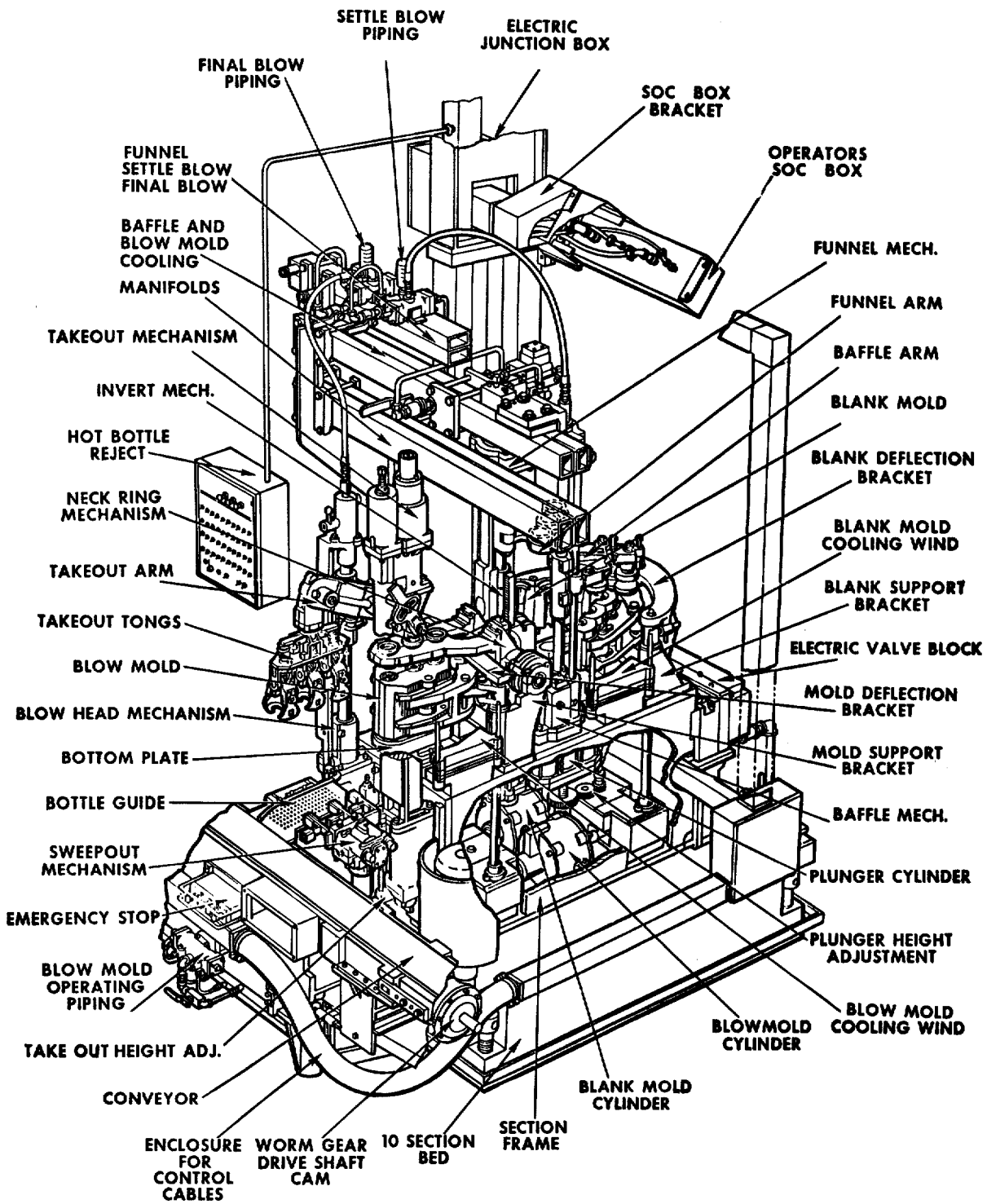
FIG. 1 is a perspective view of the major mechanical components of a single section of a triple gob IS glass container forming machine which is set up to operate in accordance with the well known "blow and blow" process.

Referring to FIG. 1 there is shown the great majority of the operating components involved in the operation of a single section of a ten section IS glass forming machine by the "blow and blow" process. The various mechanisms have been labelled rather than numbered, because this represents a prior art construction and those skilled in the art will readily identify each of the elements of the machine and the method of operation. It will be noted that all of the elements of the machine are mounted on a ten section bed with the exception of the operator's "SOC" box, which is an acronym for an operator's control box, and the piping and conduits for the final blow and settle blow operations as well as the baffle and blow mold cooling. These elements are carried on an overhead portion of the frame structure (not shown) which traverses the entire length of the ten section IS machine. The number of cylinders which have to be actuated, plus the valves for controlling such cylinders and the valves for controlling the application of cooling air currently makes the resulting machine end up as a complicated maze of pipes and control elements.

Figure 2:
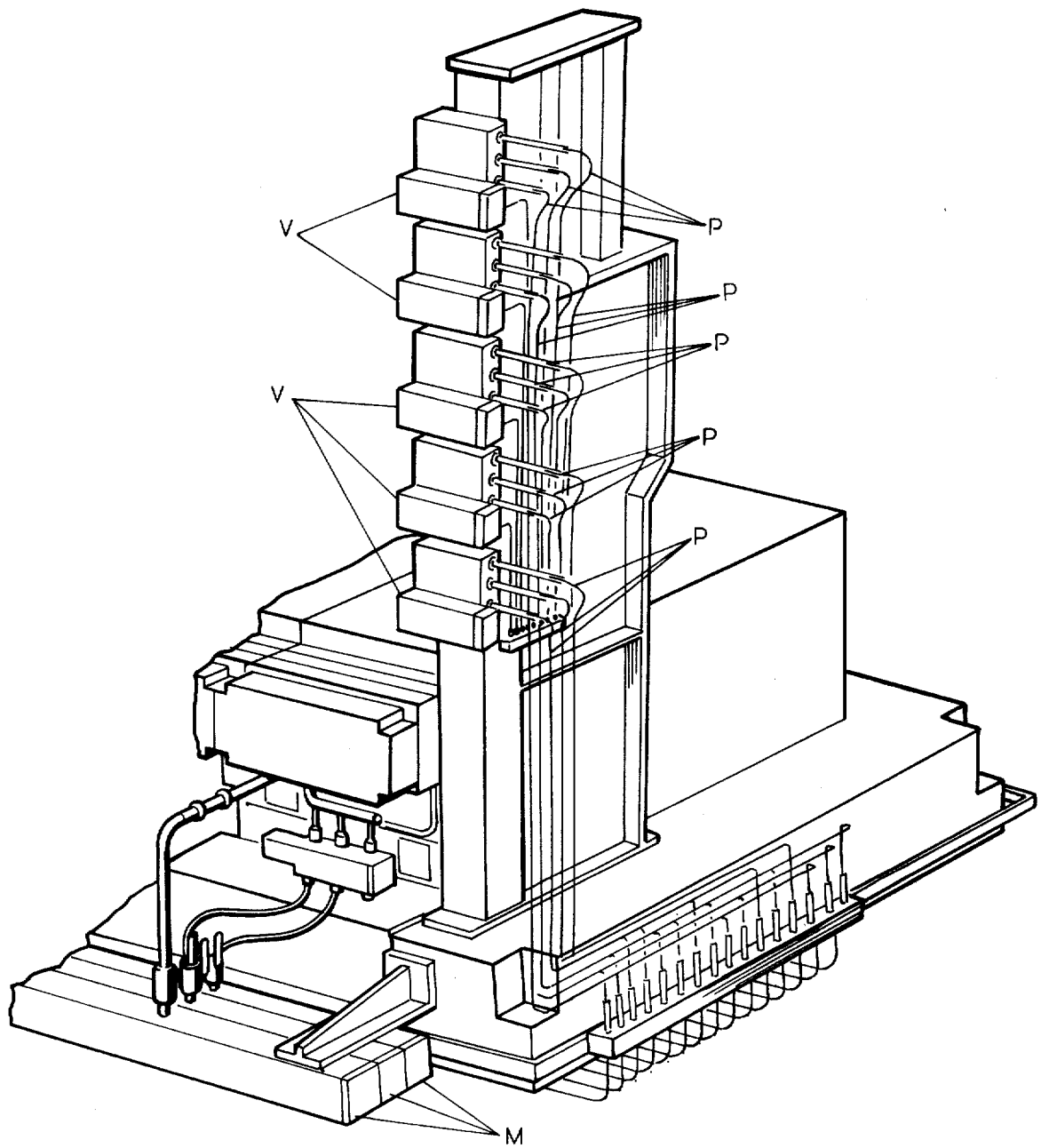
FIG. 2 is a schematic perspective view of the right hand end of an existing multi-section IS machine showing the disposition of the control valving and piping components.

This may be further appreciated by reference to FIG. 2 which is a schematic perspective view of the right hand end of a conventional IS ten section forming machine, but viewed from a rear position relative to the view of FIG. 1. It will be seen that the upright frame elements which support the previously mentioned transverse frame elements are literally covered with a multitude of control valves V and piping P associated with such valves running from the valve to the various machine elements. Additionally, a plurality of external manifolds M are provided on the rear end of the machine to conduct vacuum, high pressure pilot valve air and machine cylinder operating air to each of the thirty parison mold cavities and the thirty blow mold cavities requiring the application of such air or vacuum during the operation of the machine in conventional fashion.

Figure 3:
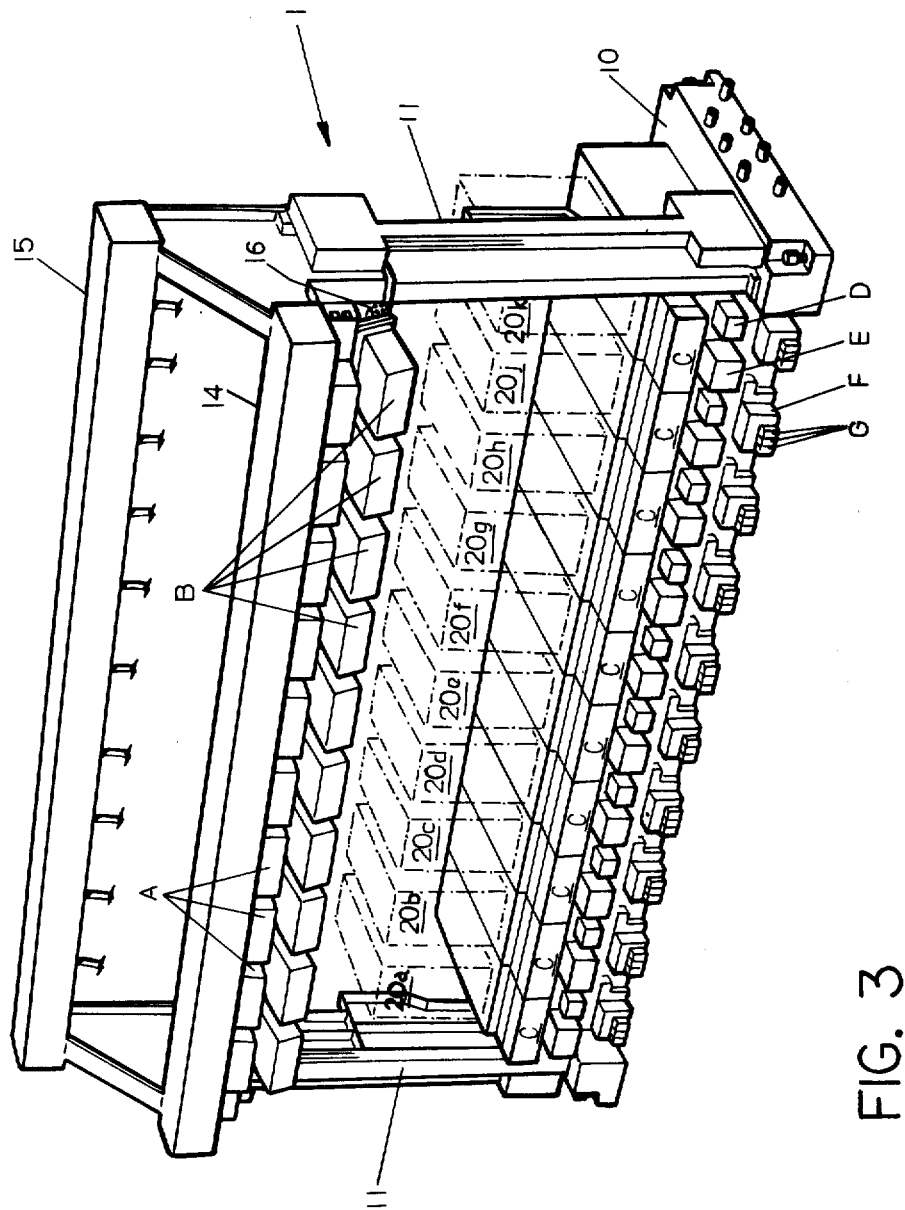
FIG. 3 is a schematic perspective view of the frame structure of a ten section IS machine frame constructed in accordance with this invention.

Referring now to FIG. 3, there is schematically shown a ten section, triple gob IS machine 1 constructed in accordance with this invention. The machine 1 includes a frame structure comprising a bed housing 10, a pair of upright end frames 11 respectively mounted at each end of the bed housing 10, and a top frame element comprising two hollow tubular housings 14 and 15 respectively secured to the tops of end frames 11 and which overlie the bed housing 10.

For clarity of illustration, no attempt is made to illustrate the details of the glass forming machine mechanism but instead such mechanisms are represented by the dotted boxes 20a, 20b, 20c, 20d, 20e, 20f, 20g, 20h, 20j and 20k respectively. It should be understood that each of these boxes include all of the mechanism commonly associated with a single section triple gob IS forming machine, of the type illustrated in detail in FIG. 1.

Figure 5:
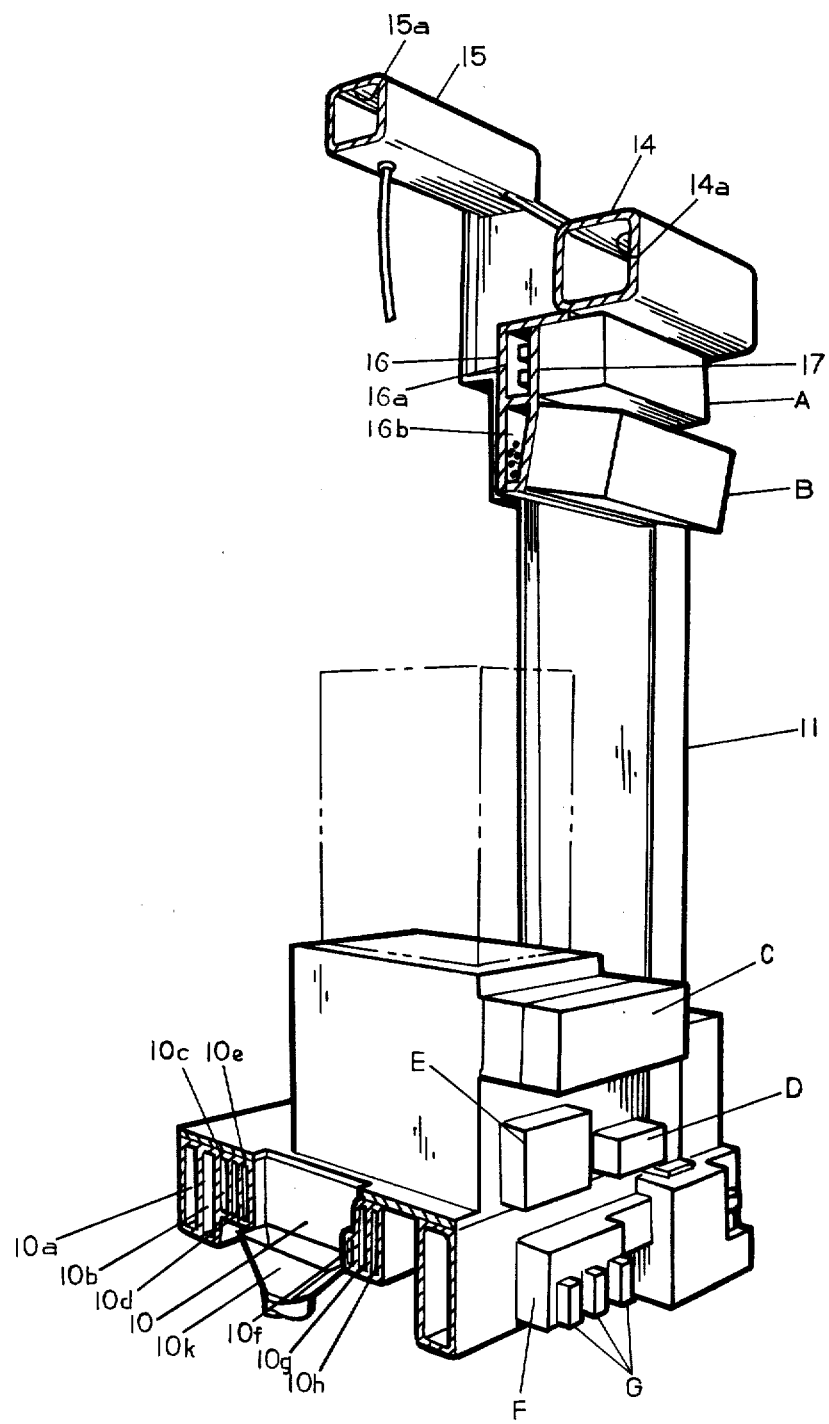
FIG. 5 is a schematic perspective view of the right hand side portion of the machine shown in FIG. 3 showing the incorporation of the various fluid channels within the bottom housing of the machine.

As best shown in FIG. 5, the bed housing 10 is hollow and includes a plurality of longitudinally extending fluid channels 10a, 10b, 10c, 10d, 10e, 10f, 10g and 10h. These channels are respectively employed for conducting mold vacuum, blank vacuum, machine air (1), machine air (2), plunger air, pilot air, exhaust, and counter blow air to or from each of the ten sections. Parison and blow mold cooling air may be supplied through a larger manifold portion 10k defined in the central section of the bed housing 10.

The overhead longitudinal frame housings 14 and 15 are, as best shown in FIG. 5, of hollow, configuration and define channels 14a, and 15a which may be utilized as conduits for air, control pipes or wiring. For example, conduit 14a may be employed to conduct air for the gob reject system (not shown). Channel 15a conducts high pressure final blow air to each section.

A frame member 16 depending from housing 14 defines channels 16a and 16b in cooperation with the front wall 17. Channel 16a accommodates two rectangularly shaped pipes, 20a and 20b which are respectively utilized as conduits for pilot valve air and pilot valve exhaust. Channel 16b houses electrical control wiring for each section of the ten section IS machine.

Figure 4:
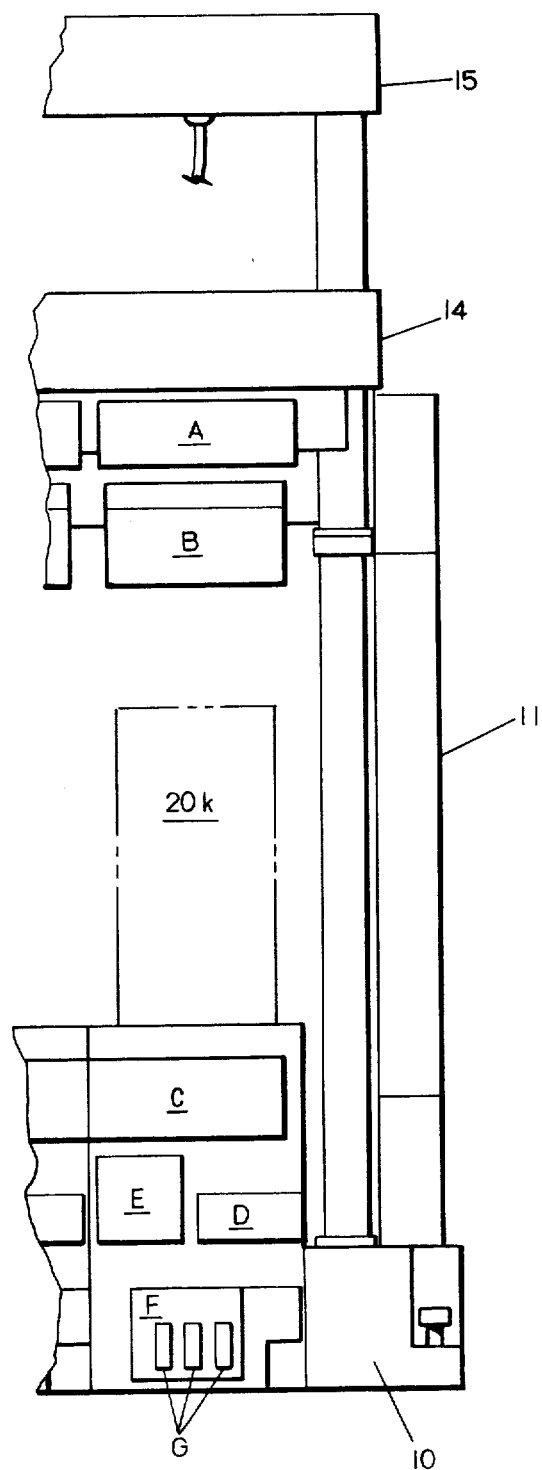
FIG. 4 is a schematic elevational view of the right hand side of the machine of FIG. 3 showing the control components added to the machine in accordance with this invention.

Referring more specifically now to FIG. 4, the location of the individual control valves for each section is shown in detail. Thus, immediately under the lowermost upper frame housing unit 14, and mounted on wall 17, there is disposed a trip valve block A which effects the control of twelve functions of the particular IS forming machine section. Immediately below valve block A is the operator's control box, called "COMSOC" which permits the operator to make certain adjustments to the individual sections in a manner well known in the art. A COMSOC control box is described in the pending application Ser. No. 224,350, filed Apr. 12, 1981, and assigned to the assignee of this application.

At a position immediately below the upper portions of the base housing 10 of the machine there is provided a main valve block C which performs 21 functions, including ten one-half inch operating valves and ten five-sixteenths inch operating valves since, as is well known, some of the control functions must be supplied with operating air through one-half inch conduits and others through five-sixteenths inch air conduits.

Immediately below the main valve block C there is provided a cooling wind valve block E which performs eight functions, utilizing five-sixteenths inch valves. Adjacent to the cooling wind valve block E is a press and blow valve block D which performs three regulated functions utilizing one-half inch valves. As is well known to those skilled in the art, if the particular IS machine is converted to a press and blow operation, then a pressing plunger (not shown) and a special parison mold must be incorporated in the parison forming side of the IS machine and the operation of such plunger incorporated into the control sequence.

Below the valve blocks D and E is mounted a counter blow valve block F which performs three functions with one-half inch valves and is, of course, employed when the IS machine is operating in the blow and blow mode. Lastly, three valves G are mounted on the outer face of the counter blow block 35 to control the supply of vacuum to the machine section when it is desired to operate the IS machine in accordance with the "51" process, previously described.

It should be particularly noted that substantially all of the piping and wiring associated with these various valve blocks are disposed within the hollow frame elements of the machine, either the bed housing 10 or the upper frame housings 14a, 15a, 16a or 16b and thus does not result in a cluttering of each section of the machine with a proliferation of piping and wiring. More importantly, it will be noted that the described arrangement provides for accomplishing a total of fifty functions. In the normal operation of the IS machine in accordance with the blow and blow process, the control of not more than 21 functions is required. The additional 29 functions provided by a machine constructed in accordance with this invention are to permit the machine to be readily converted to operate in accordance with any one of the five other aforementioned modes of operation without requiring the addition of control valves and related piping of the machine.

The control of the required number of valves for any selected process mode is effected electrically through a computer by utilizing the method and apparatus described in detail in the aforementioned U.S. Pat. No. 4,152,134. A program is provided for each of the process modes, and the selected program is plugged into the computer (not shown) at the same time that the required mechanical equipment changes are made to the ten section IS machine to change it from one forming process mode to another. Thus, in each selected process mode, the operation of the required number of control valves, which will always be less than the total number of valves provided on the machine, will be effected by the computer in accordance with the selected program. Minor adjustments to each of the operating sections may still be made by the operator through utilization of the operator's "COMSOC" box provided on each section. Such adjustments are, however, of a minor nature such as minor timing, automatic swabbing, etc. and do not require the continuous attention of the operator.

Referring now to the chart shown in FIGS. 6A and 6B, the location and utilization of the fifty function set of valve blocks heretofore described to effect the operation of the ten section IS machine in any selected one of its six potential modes of operation is detailed.

The valve utilization headings used in FIGS. 6A and 6B are as follows:

BB means Blow and Blow Process
51 means "51" Process
41 means "41" Process
62 means "62" Process
VB means Vacuum Blow Process
PB means Puff Blowing Process Thus, by modifying the mechanical components of the machine, such as the insertion of plungers to operate in accordance with either of the two press and blow processes, the machine may be readily converted, without any significant modification of the in place control valves and associated piping, to function in any one of six different operating modes. More importantly, because of the elimination of the proliferation of external piping associated with the conventional IS forming machine, there is now sufficient room in and around each of the individual sections to permit individual blow air piping and control valves (not shown) to be connected to each cavity of the multi-cavity parison molds and blow molds. The desirability of this is that each cavity may now be individually controlled, whereas in prior art structures, all three cavities of either a multi-cavity parison mold or multi-cavity blow mold had to be controlled as a unit. Those skilled in the art recognize that the operating characteristics of each cavity of a multi-cavity parison mold or a blow mold vary slightly from the other, and this flexibility in permitting individual control of each cavity greatly improves the efficiency of the IS forming process.

Figure 7:
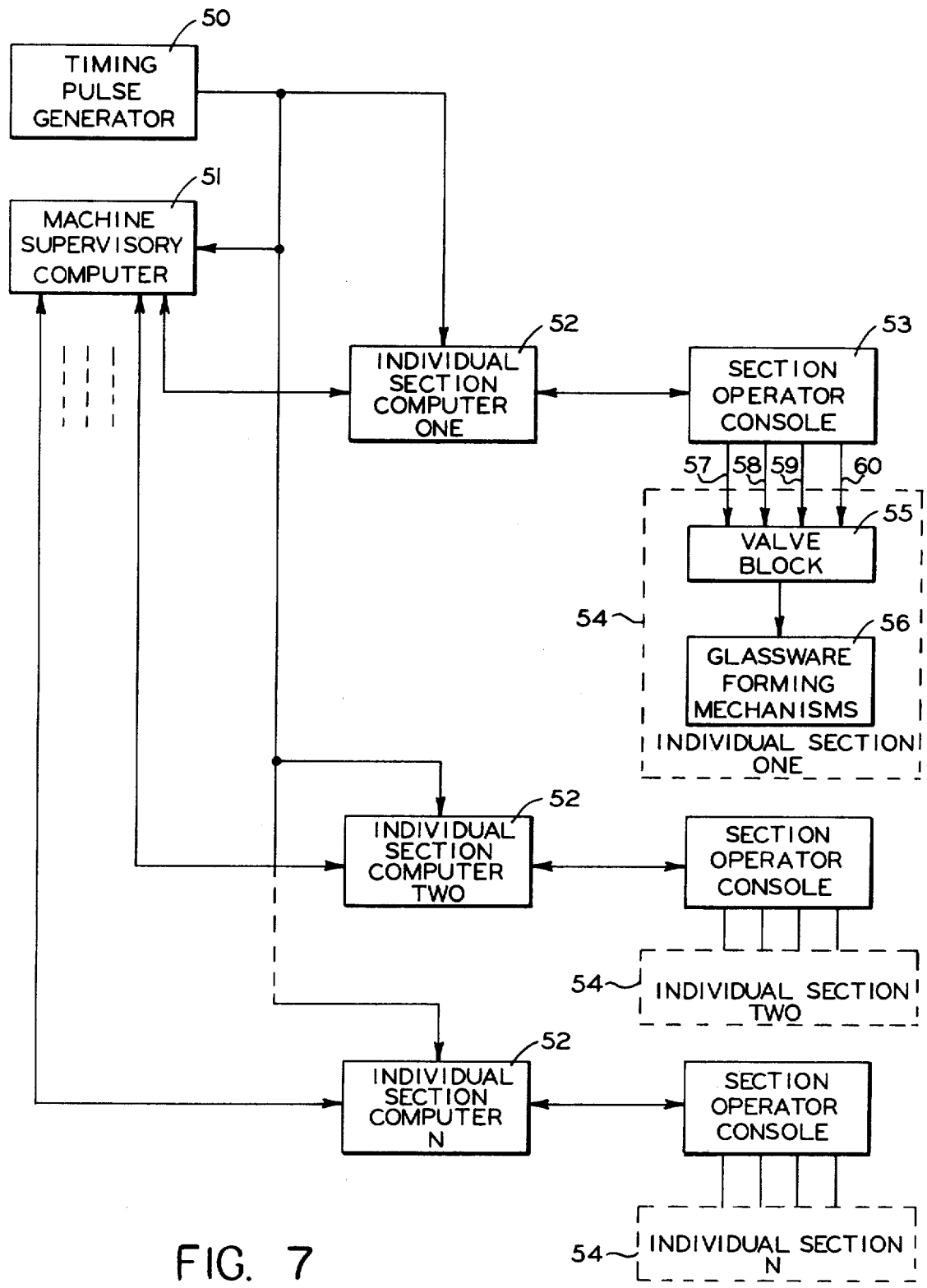
FIG. 7 is a block diagram of a control system and the individual sections of an IS glass container forming machine in accordance with this invention.

There is shown in FIG. 7 a block diagram of the control system and individual sections of an IS glass container forming machine in accordance with the present invention. A timing pulse generator 50, a machine supervisory computer 51, an individual section computer 52, and a section operator console 53 are described in detail in the aforementioned U.S. Pat. No. 4,152,134. The machine supervisory computer 51 receives a train of timing pulses from a timing pulse generator 50 to establish the timing for the machine cycle. The machine supervisory computer 51 is connected to a plurality of individual section computers 52, one-N, each of which is connected to an associated one of plurality of individual sections 54, one-N of the glassware forming machine. Initially, the machine supervisory computer 51 loads each individual section computer 52 with the control program and timing data for controlling the associated individual section. Thereafter, each individual section computer 52 generates control signals, in response to the control program and timing pulse generator 50, to a valve block 55 in the associated individual section 54 to control the glassware forming cycle. The valve block 55 is connected to a plurality glassware forming mechanisms 56 for actuating the forming mechanisms in a predetermined timed sequence of steps to the form the articles of glassware. The valves in the valve block 55 are actuated by solenoids (not shown) which are controlled by signals generated by the individual section computer 52 in accordance with the control program and timing data which are stored therein. The machine supervisory computer 51 periodically receives current timing data from each of the individual section computers 52 which data can be stored for use the next time that particular type of glassware to be formed or in the event that one of the individual sections is shut down for any reason.

In the present invention, the valve block 55 is provided with the fifty function set of valves heretofore described. The individual section computer 52 generates a control signal for each of the valves through the section operator console 53 to the valve block 55 on one of a plurality of output lines. There is shown in FIG. 7 only four of such output lines 57 through 60 in the interest of clarity. During of any one of the modes of operation of the machine identified in FIGS. 6A and 6B, the individual section computer will generate control signals over selected ones of the output lines to actuate selected ones of the valves in the valve block 55. For example, during a first mode of operation, the individual section computer 52 would generate control signals over the lines of 57, 58 and 59 and not over the line 60. During second mode of operation, the individual section computer 52 would generate control signals over the output lines 57, 58 and 60 and not over the output line 59. Thus, it will be appreciated that the section operator console 53 is provided with all of the output lines necessary to control a fifty function set of valve blocks and that the required set of control signals will be generated by the individual section computer 52 in accordance with the control program and timing values stored therein as received from the machine supervisory computer 51 and as may be changed during the operation of the machine through the section operator console 53 as explained in more detail in the aforementioned U.S. Pat. No. 4,152,134. Furthermore, the present invention can be operated with section operator console (SOC) 53 or with the operator's control box (COMSOC) identified herein.

Other objects and advantages of the invention will be readily apparent to those skilled in the art, as well as modifications in the location of the specific valving units. It is therefore intended that the scope of the invention be determined solely by the appended claims

I claim:

1. In a glass container forming machine of the type where a plurality of individual sections are juxtaposed and receive mold charges from a common feeder, with each section being capable of producing a completed container by itself, and the sections all rest on a common base, the improvement comprising said base having a plurality of elongated channels formed therein that extend the length thereof and are structurally part of the base, a plurality of elongated tubular housings extending parallel to said base and coextensive therewith, said housings being elevated above the sections, one said tubular housing serving as a common manifold for blow air to all of the blowheads on all of the sections, means connecting sources of air under pressure to selected channels in said base, means providing electrical leads within others of said channels in said base, means providing ductwork for electrical leads in the supporting structure for the said tubular housing and extending parallel thereto, said channels in said base serving to provide operating air under more than one pressure to motors on all of said sections, electrically actuated valve means in the connections from the channels to said operating motors, and computer means connected to said valve means in each section for actuating said valves in a predetermined sequence 2. In an IS type glass container forming machine wherein a plurality of individual forming machine sections are positioned in alignment on a common base with each section having a blow mold, parison mold, parison transfer mechanism, blow head, baffle, funnel, and takeout mechanism; all driven by the operation of reciprocating fluid motors, each fluid motor being timed by the operation of an electrically operated pivot valve for operating a poppet valve interposed a source of fluid under pressure and the fluid motor, the improvement in the system comprising at least two fluid passages extending lengthwise through said base for feeding operating air to said fluid motors, a source of fluid under pressure connected to each said fluid passages, a further fluid passage within said base extending the length thereof, a source of cooling wind connected to said further fluid passage for providing cooling wind to the forming molds, a vacuum passage extending lengthwise through said base in parallel to said fluid passages, a source of vacuum connected to said vacuum passage, said vacuum passage being selectively connectable to the forming machine sections for providing vacuum settle of a charge of glass in the parison mold, when that mode of parison formation is desired, a computer connected to the pilot valves in each section for actuating the valves in a predetermined sequence for operating the section in a particular mode, a main computer having a memory bank connected to each section computer and operator controlled means for selecting the memory bank for the mode of operation of the sections desired.

3. The apparatus defined in claim 1 or 2 plus separate cooling air connections to each cavity of the multicavity parison molds and blow molds of each section, and individual electronically controlled valve means for each said air connection, thereby permitting computer control of temperature of each molding cavity in all the forming modes.

* * * * *